United States Patent [19]
Hepp

[11] Patent Number: 4,545,710
[45] Date of Patent: Oct. 8, 1985

[54] APPARATUS FOR AUTOMATED LESS-THAN-TRUCK LOAD SHIPMENTS

[75] Inventor: Peter S. Hepp, Alexandria, Va.

[73] Assignee: Sun Carriers, Inc., Philadephia, Pa.

[21] Appl. No.: 403,223

[22] Filed: Jul. 29, 1982

[51] Int. Cl.[4] ............................................. B65D 19/38
[52] U.S. Cl. ...................................... 410/32; 108/53.1; 108/55.1; 211/194; 410/46; 410/121; 414/498
[58] Field of Search ..................................... 410/31–33, 410/46, 58, 77, 41, 78, 84, 87, 88, 92, 94, 95, 121, 155, 156, 39; 414/498; 206/821, 503, 509; 108/53.1, 555, 55.1; 211/189, 194, 195

[56] References Cited

U.S. PATENT DOCUMENTS

| | | | |
|---|---|---|---|
| 1,405,757 | 2/1922 | Clark | 410/31 |
| 2,144,600 | 1/1939 | Koonce | 410/33 |
| 2,370,551 | 2/1945 | Liebegott et al. | 410/33 |
| 2,577,726 | 12/1951 | Saul, Jr. | 108/53.1 X |
| 3,169,640 | 2/1965 | Favre | 206/509 |
| 3,244,290 | 4/1966 | Kauffman et al. | 211/189 |
| 3,458,052 | 7/1969 | Kann | 211/193 |
| 3,543,951 | 12/1970 | Marvin | 410/32 |
| 3,989,140 | 11/1976 | Crane | 206/821 X |
| 4,239,435 | 12/1980 | Weiss et al. | 104/88 X |
| 4,313,702 | 2/1985 | DiMartino | 410/94 |
| 4,429,850 | 2/1984 | Weber et al. | 211/193 |

Primary Examiner—Robert B. Reeves
Assistant Examiner—Donald T. Hajec
Attorney, Agent, or Firm—J. Edward Hess; Donald R. Johnson; Stanford M. Back

[57] ABSTRACT

A knock-down support system for standard-sized containers which enables the containers to be automatically handled on rails, hangers or the like for routing, loading and unloading onto trucks.

5 Claims, 6 Drawing Figures

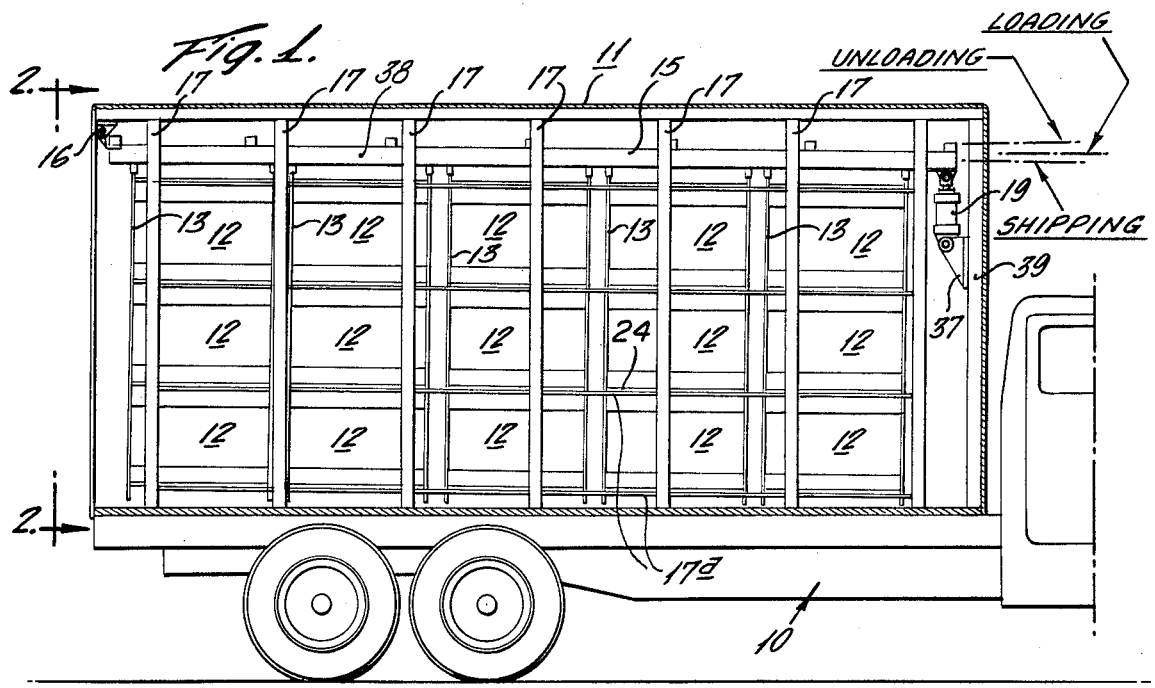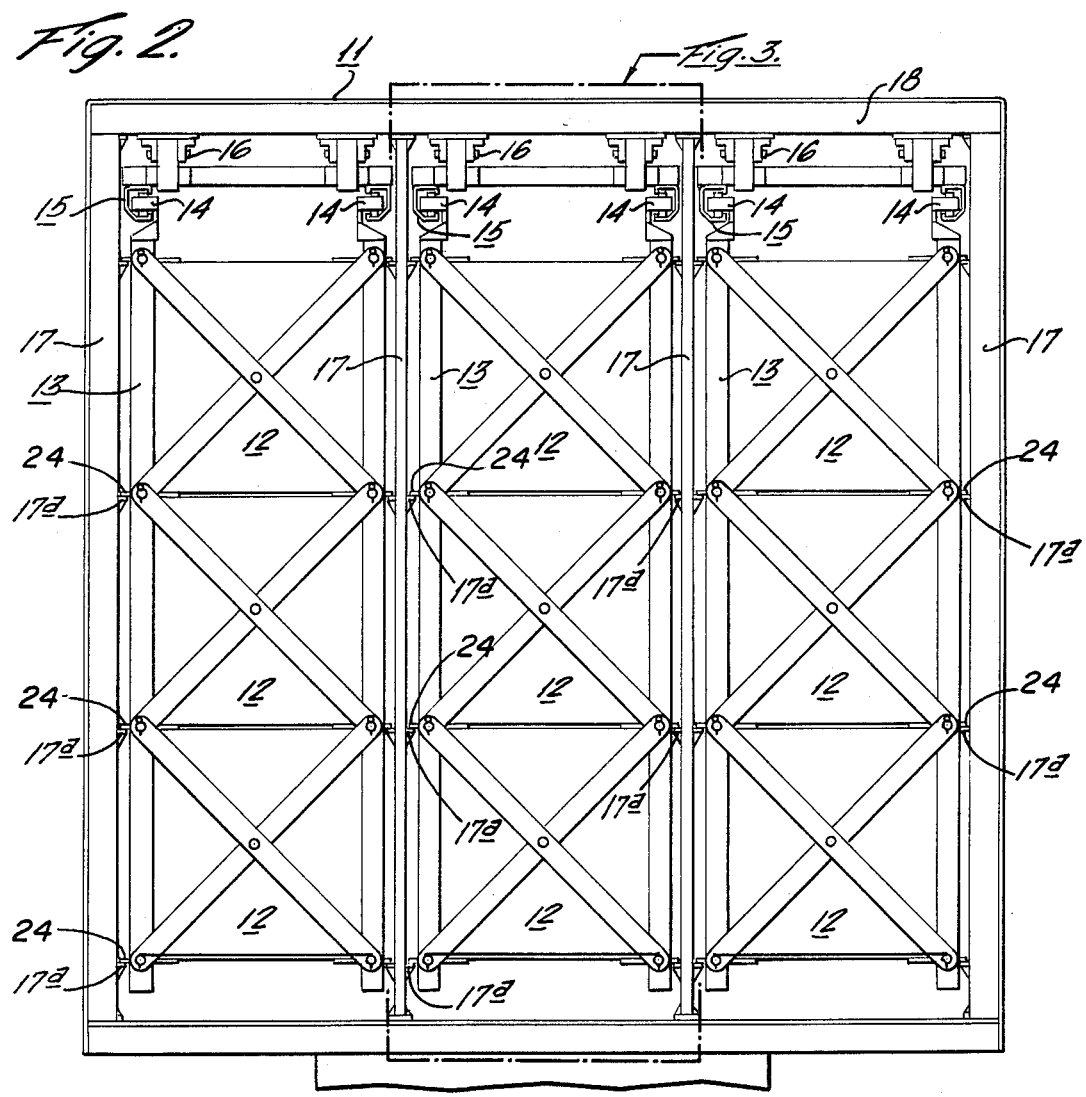

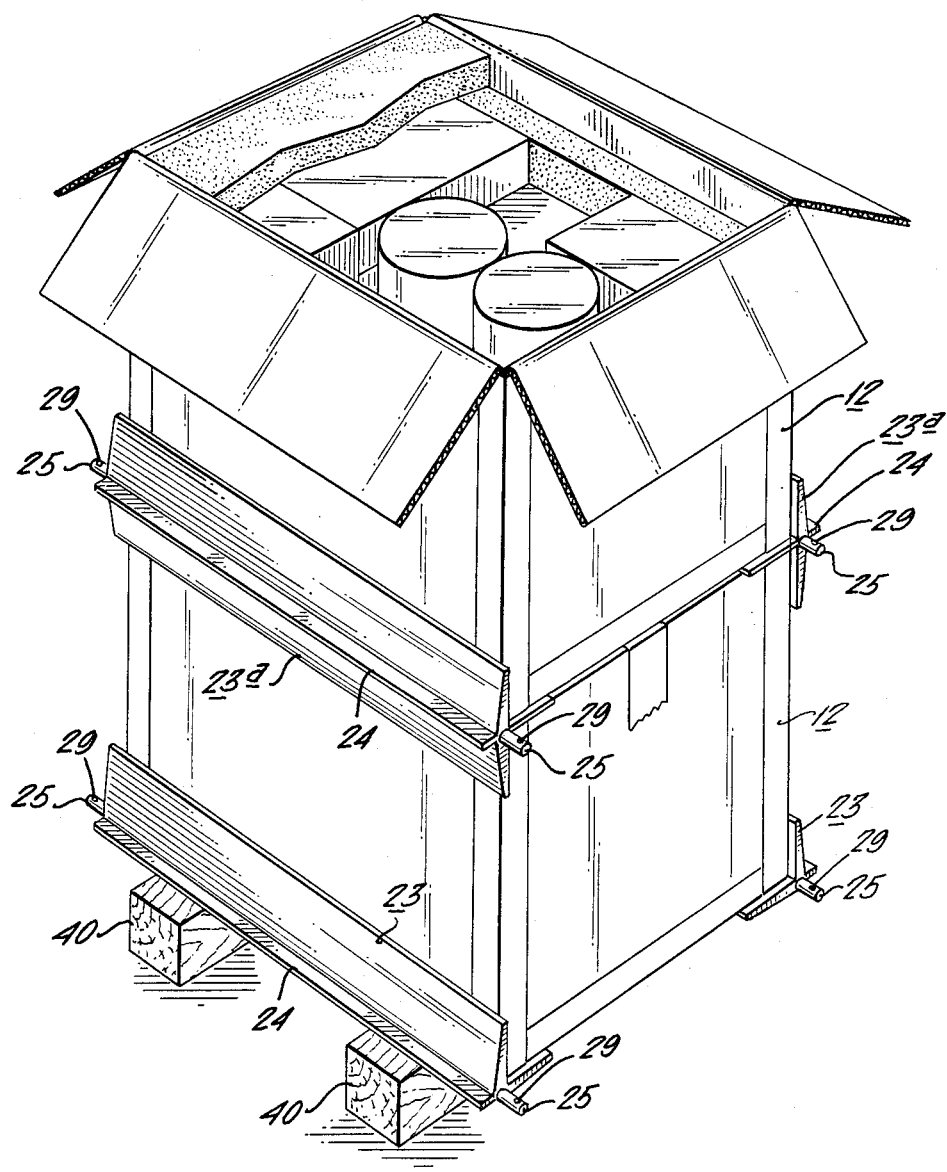

APPARATUS FOR AUTOMATED LESS-THAN-TRUCK LOAD SHIPMENTS

BACKGROUND OF THE INVENTION

The transportation of general freight by truck uses very few labor saving devices. International general freight has improved its efficiency through the use of standard containers for ocean shipping. No such containerization has been available for freight movement in the less-than-container or less-than-truck load shipment. Transport of single packages of under approximately 50 lbs. has been highly automated through the use of conveyor systems and other labor saving capital. Shipments whose total aggregate weight lies between 100 and 2,000 lbs., however, represent a significant portion of all shipments and these are relatively inefficient and expensive to handle. Most of these shipments consist of multiple packages and the integrity of the entire shipment is a major problem through loss, pilferage and damage. The present invention provides a solution to these problems inherent in the shipment of multiple packages in less-than-truck load lots.

The apparatus of the present invention will enable essentially total automation for the movement of goods with the use of a single truck driver for pick-up and delivery. Thus, the system lends itself for use of conventional devices for automatic routing, billing, loading and the like.

BRIEF STATEMENT OF THE INVENTION

In accord with the invention there is provided in combination, a box of standard size to contain the goods to be shipped and a support system for the box adapted to be built-up around the box or it may be knocked-down, as required, and means which enables the handling of the box to be automated.

BRIEF DESCRIPTION OF THE DRAWINGS

FIG. 1 is a fragmentary side elevational view partially in section of a typical medium size truck, having it's cargo space fabricated in accordance with the invention to transport containers of a standard size.

FIG. 2 is a slightly enlarged and elevational view of the truck shown in FIG. 1 showing the geometry of the 3 independent metal support systems and overhead tracks. The view is taken on the line 2—2 of FIG. 1.

FIG. 6 is a perspective view of two standard containers as used in the invention.

DETAILED DESCRIPTION OF THE INVENTION

Figure 3:
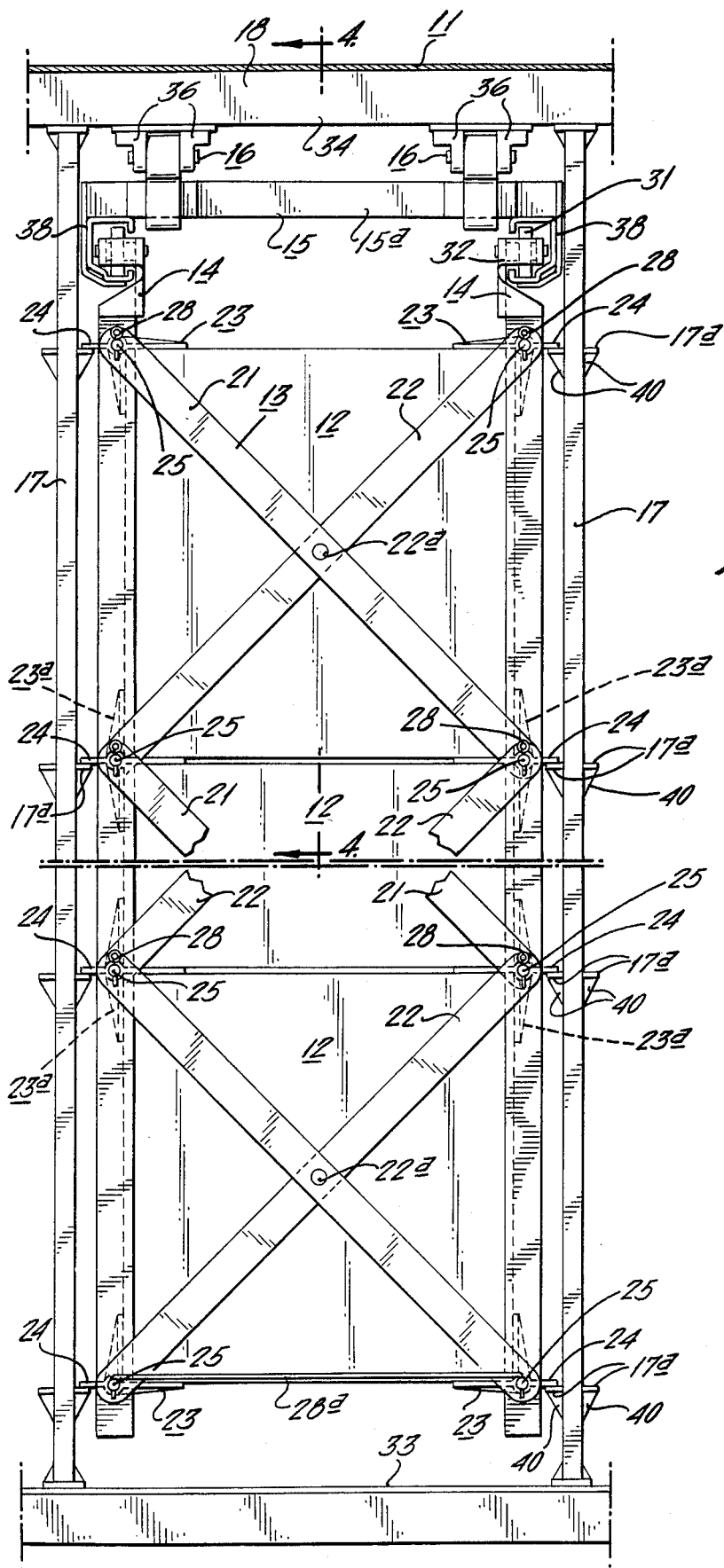
FIG. 3 is an enlarged fragmentary elevational view of the central metal support system and its associated overhead track and includes in greater detail the portions of the drawing shown in FIG. 2 enclosed by the broken line.

As indicated, the invention embodies a knock-down support system for standard-sized containers which enables said containers to be automatically handled for routing, shipping and the like, and comprises, in combination, a box to contain goods to be shipped and a support system surrounding the box, the support system comprising four horizontally extending gripping members at parallel edges of the container, four L-shaped vertical members positioned at the four vertical edges of the container and an X-frame pivoted at its center, the gripping members, the vertical members and the X-frame being adapted with means for easy assembly and disassembly to each other and the vertical members being adapted with means for moveably supporting the assembly from an overhead rail or track. Preferably, each support system of the invention will be constructed to support a multiple number of the standard containers.

Referring now to FIG. 1 and FIG. 2, an enclosed container truck shown generally as 10 has its enclosed container carrying portion 11 made up of vertical structural members 17 and horizontal tie bars 18. The truck is loaded with boxes 12 of a standard size. The boxes are spaced vertically within an easily assembled metal support system shown generally as 13 and shown in more detail in FIGS. 3 and 5. The support system is suspended by means of four corner rollers mounted in roller retaining brackets 14 on an adjustable overhead track assembly 15 supported adjacent the top of the truck by means of pivot assemblies 16 at the rearmost terminal end of the track assembly and the front terminal end of the track assembly being connected and mounted on the actuator end of a ram 19 in the lowered position. As shown in FIGS. 1, 2, 3 and 4 of the drawings, the load is supported on slightly pitched horizontally extending rails systems 17a which cooperate with horizontally extending flanges 24 of the support system 13. When in the lowermost position, the side flanges 24 come into contact with the horizontally extending fixed rail system 17a and both support the load and frictionally restrain movement of the support systems 13. There are three independent track systems 15, each having it's own independent hydraulically operated elevational control ram 19 so that the track can be raised or lowered. When loading the truck the track will be lowered so that stacked boxes will roll toward the front section of the track and, conversely, when unloading, the track will be raised so the box support system will roll toward the rear. While in transit, the track will be put in its lowered position so that no lateral movement will occur. It will be understood that other means of handling the box support system in the truck may also be used, such as, for example, the hanging of the box from a single, centrally located support point.

The truck shown in FIG. 1 has three independent tracks 15, three individual hydraulic cylinders 19 for each track and each track system supports 5 individual metal support systems 13 with three standard sized boxes 12 within the truck. The truck illustrated can accomodate 45 containers of standard size (approximately 23"×24"×30").

FIG. 2 which is taken along lines 2—2 of FIG. 1 shows the geometry of the three independent support systems and overhead tracks and shows generally how each individual standard container 12 is supported by the collapsable frame.

Figure 4:
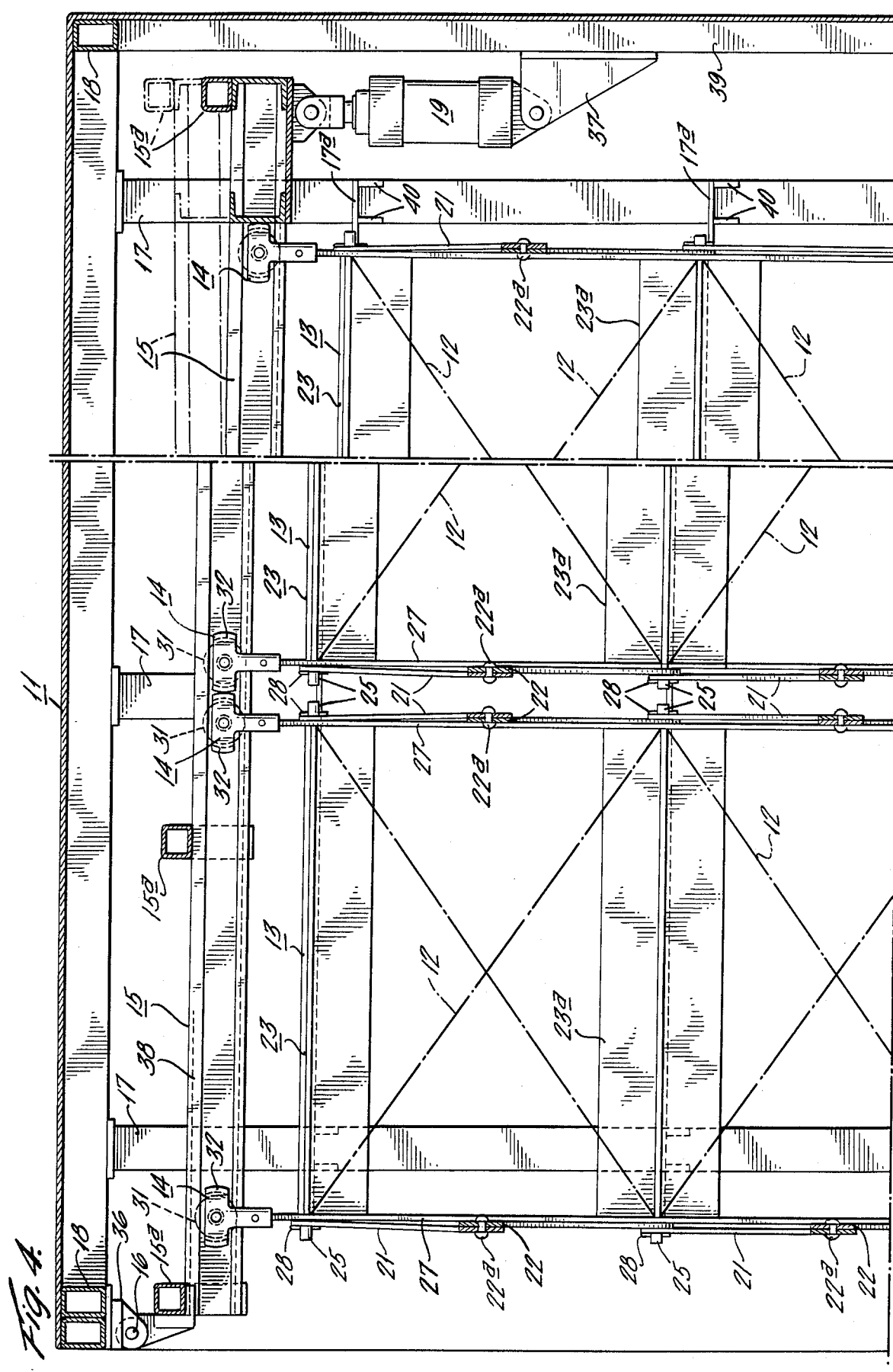
FIG. 4 is a fragmentary sectional side elevational view taken on the line 4—4 of FIG. 3 showing additional details of the metal support systems and overhead tracks.
Figure 5:
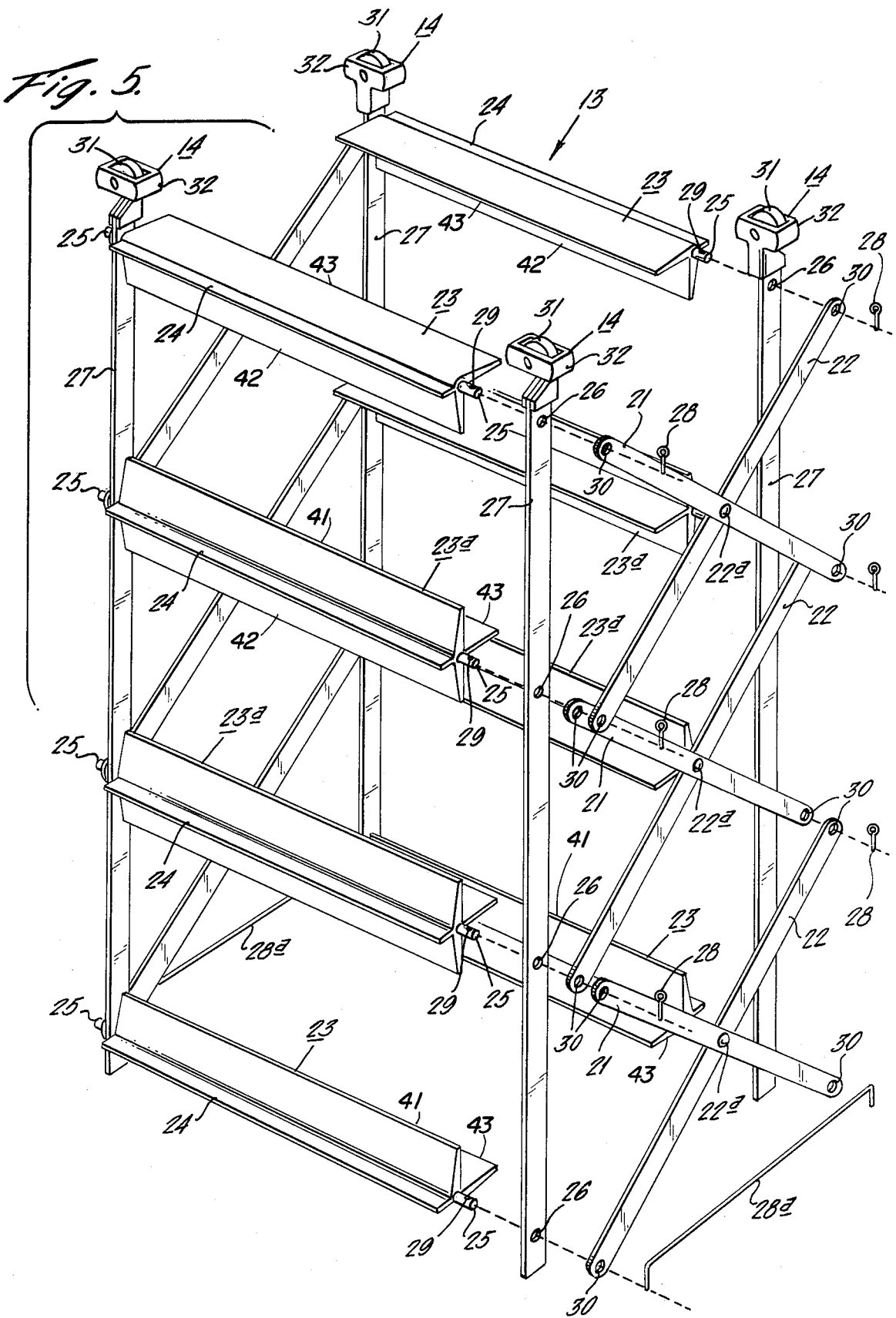
FIG. 5 is a perspective view of one complete metal support system with the right hand side of the drawing exploded to show means of assembly and disassembly.

Referring now to FIG. 5, the collapsable frame support system 13 is shown in more detail. Cross members 21 and 22 are permanently pivoted as by means of a pivot 22a. Horizontally extending gripping and or support vanes 23 and 23a both grip and support the standard sized cartons. A side flange 24 on gripping members 23 and 23a provides frictional engagement with the truck frame rails 17a to prevent slipping and to help support the load (See FIG. 3). The gripping members 23 and 23a each have an inwardly extending flange 43, as well as the outwardly extending side flange 24. The gripping members 23a also each have an upwardly extending flange 41 and a downwardly extending flange 42. The uppermost gripping members 23 have downwardly extending flanges 42 and the lowermost gripping members 23 have upwardly extending flanges 41. The gripping members 23 and 23a have trunnions 25 which extend through apertures 26 on vertical members 27 and through corresponding holes 30 at the ends of the X-frame members comprised of the pivoted cross members 21 and 22. A fastening pin 28 which is dropped through a hole 29 in trunnions 25 and held by gravity may be used to lock the assembly together. At the bottom of the assembly a tie bar 28a is used instead of fastening pins in order to tie the assembly together and prevent spreading. The upper terminal ends of the vertical members 27 are capped by roller assemblies 14 comprising a roller 31 and roller supporting means 32, which support the assemblies 13 on the rails 15 at the top of the truck as shown in FIG. 2, FIG. 3 and FIG. 4.

Referring now to FIG. 3 which is the center section of FIG. 2, the knock-down box support system 13 of the invention is shown mounted in a truck body. Vertical truck frame supports 17 extend between the floor of the truck 33 and the truck top 34. Bearing blocks 36 are mounted on horizontal tie bar 18 at the rear end of the truck and pivotly mounted at 16 are the rearmost terminal ends of the track assemblies 15. The track assemblies 15 comprises "C" shaped tracks 38 tied in pairs by means of cross tie members 15a. The rollers 31 ride within the tracks 38 and slidably support the knockdown box support system 13. The vertical supports 17 have appropriately placed supports 40 upon which rails 17a are mounted and upon which side flanges 24 of gripping members 23 and 23a rest to provide frictional engagement and prevent slipping as mentioned above.

FIG. 4 which is taken along line 4—4 of FIG. 3 shows in more detail the support systems and overhead rollers 31 in the tracks 38 and also shows how the track 15 may be supported at the rear of the truck by a pivot 16 and raised or lowered by a hydraulically operated elevational control 19 supported by a bracket 37 attached to the truck frame 39. As shown by the solid lines, the track 15 is in the lowered position tilting downwardly from the rear to the front of the track. The dashed lines show the track in a raised position which will be used for unloading the assemblies.

FIG. 6 is a perspective view of two standard containers 12 of this invention. The lowermost container rests upon the two lowermost support vanes 23. These in turn, are spaced above the floor level by means of two wooden blocks 40 or the like. This is necessary to provide ground clearance for the four vertical corner members 27 (See FIG. 5).

Each container 12 is filled with smaller containers and objects of random sizes, padded, and sealed as shown in FIG. 6. In using the system of the invention, an intermediate set of support vanes 23a is placed on top of the bottom container 12 and the second container 12 is then placed atop these, and another vane 23a placed on it and the third container 12 placed on top. Then the uppermost vane 23 is placed across the top of the uppermost container 12, the corner vertical members 27 are slid into position over the short trunnions 25 of the vanes and the whole support system locked together by means of pins 28 and 28a through the trunnions 25 as described above except for the two lowermost trunnions which are tied together by means of a width-extending rod 28a having two short downwardly directed a segments (See FIG. 5) to tie together the lower portion of the metal support systems and prevent spreading.

In operation the system will preferably be in cooperative relationship with an automated terminal with external track at the loading and shipping docks and the assemblies will be rolled from the truck onto the external tracks for further handling. This can be done with fully automated systems responsive to directions obtained from conventional bar codes attached to the standard sized cartons which by means of an optical scanning system will also be routed as desired. The optical scanning system and bar codes on the standard containers may also be used for inventory control, billing procedures and the like.

I claim:

1. A supported container assembly adapted for transport within a vehicle having a container-carrying portion, comprising:
    (1) a first container,
    (2) a second container vertically stacked on said first container,
    (3) a lower pair of horizontally extending gripping members each having an inwardly extending flange and an upwardly extending flange gripping the bottom and sides of said first container, and each having ends extending beyond the first container at either end,
    (4) an upper pair of horizontally extending gripping members each having an inwardly extending flange and a downwardly extending flange gripping the top and sides of said first container and each having an upwardly extending flange gripping the sides of said second container,
    (5) two pairs of vertical supports,
    (6) means for frictionally engaging said gripping members with said vertical supports,
    (7) two pairs of vertical members,
    (8) means for securing the ends of said gripping members to said vertical members, and
    (9) means for suspending said containers, gripping members and vertical members within said container-carrying portion.

2. Assembly according to claim 1 and additionally comprising x-frames pivoted at the center and means for securing said x-frames in fixed relation to said gripping members and said vertical member adjacent the ends of said containers.

3. A supported container assembly adapted for transport within a vehicle having a container-carrying portion comprising:
    (1) a plurality of vertically stacked containers,
    (2) a lowermost pair of horizontally extending gripping members each having an inwardly extending flange and an upwardly extending flange gripping the bottom and sides of the lowermost container and each having ends extending beyond the lowermost of said containers at either end,
    (3) an uppermost pair of horizontally extending gripping members each having an inwardly extending flange and a downwardly extending flange gripping the top and sides of the uppermost container and each having ends extending beyond the uppermost of said containers at either end,
(4) at least one intermediate horizontally extending gripping member, each having an inwardly extending flange and upwardly and downwardly extending flanges gripping the top and sides of one container and the bottom and sides of the container above said one container and each having ends extending beyond said one container at either end,
(5) two pairs of vertical supports,
(6) means for frictionally engaging said gripping members with said vertical supports,
(7) two pairs of vertical members,
(8) means for securing the ends of said gripping members to said vertical members, and
(9) means for suspending said containers, gripping members and vertical members within said container-carrying portion.

4. A supported container assembly comprising:
(1) a first container,
(2) a second container vertically stacked on said first container,
(3) a lower pair of horizontally extending gripping members each having an outwardly extending flange and each having an inwardly extending flange and an upwardly extending flange gripping the bottom and sides of said first container and each having ends extending beyond said first container at either end,
(4) an upper pair of horizontally extending gripping members each having an outwardly extending flange and each having an inwardly extending flange and a downwardly extending flange gripping the top and sides of said first container and an upwardly extending flange gripping the sides of said second container, and each having ends extending beyond said second container at either end,
(5) two pairs of vertical supports,
(6) rails attached to each vertical support, said outwardly extending flange of each gripping member resting on one of said rails,
(7) a pair of horizontal track members,
(8) two pairs of vertical members, each having an upper end extending above said second container,
(9) means for securing the ends of said lower pair of gripping members and the ends of said upper pair of gripping members to said vertical members, and
(10) roller means attached to the upper end of each vertical member, said roller means engaging and being adapted to roll in said track members.

5. A supported container assembly comprising:
(1) a plurality of vertically stacked containers,
(2) a lowermost pair of horizontally extending gripping members each having an outwardly extending flange and each having an inwardly extending flange and an upwardly extending flange gripping the bottom and sides of the lowermost container and each having ends extending beyond the lowermost of said container at either end,
(3) an uppermost pair of horizontally extending gripping members each having an outwardly extending flange and each having an inwardly extending flange and a downwardly extending flange gripping the top and sides of the uppermost container and each having ends extending beyond the uppermost of said containers at either end,
(4) at least one intermediate horizontally extending gripping member, each having an inwardly extending flange and upwardly and downwardly extending flanges gripping the top and sides of one container and the bottom and sides of the container above said one container, and each having ends extending beyond said one container at either end,
(5) two pairs of vertical supports,
(6) rails attached to each vertical support, said outwardly extending flange of each gripping member resting on one of said rails,
(7) a pair of horizontal track members,
(8) two pairs of vertical members, each having an upper end extending above said uppermost of said containers,
(9) means for securing the ends of said lower pair of gripping members and the ends of said upper pair of gripping members to said vertical members, and
(10) roller means attached to the upper end of each vertical member, said roller means engaging and being adapted to roll in said track members.

* * * * *